UNITED STATES PATENT OFFICE.

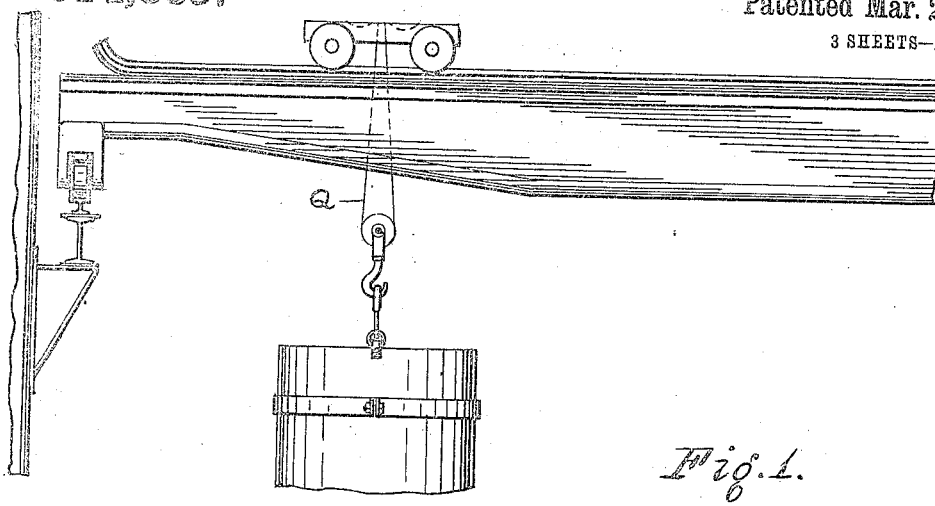
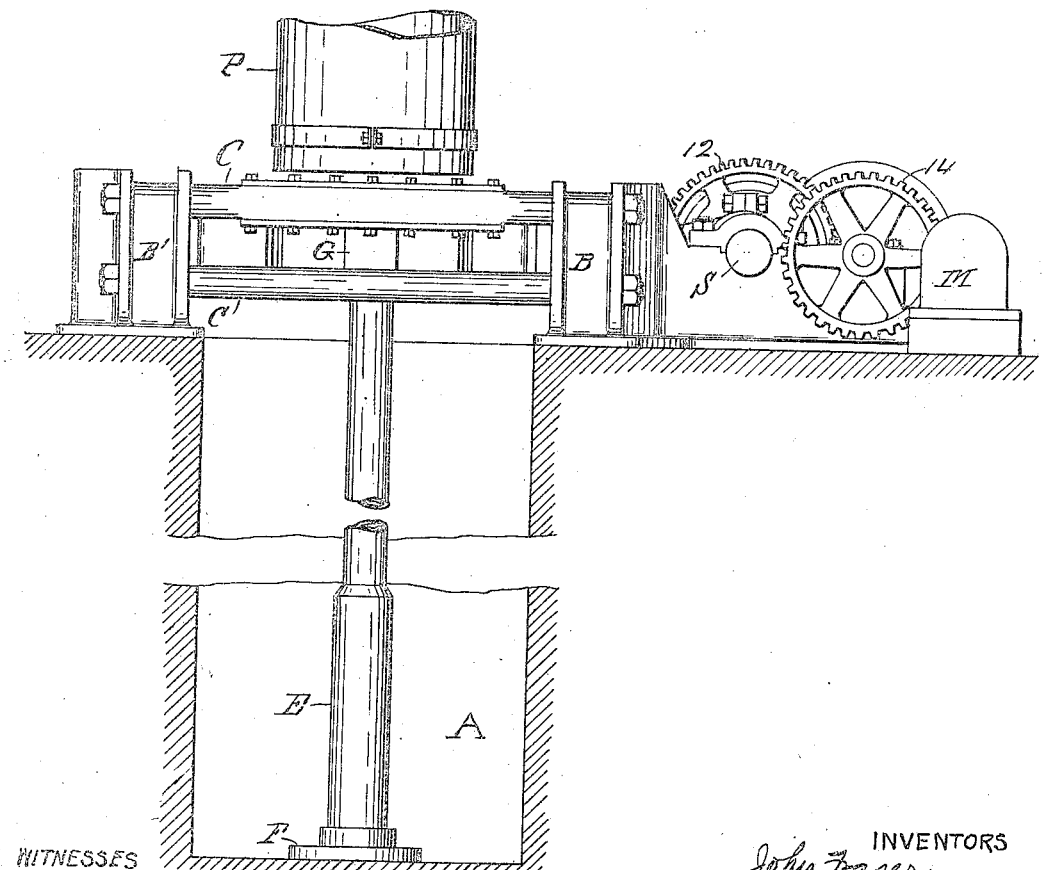

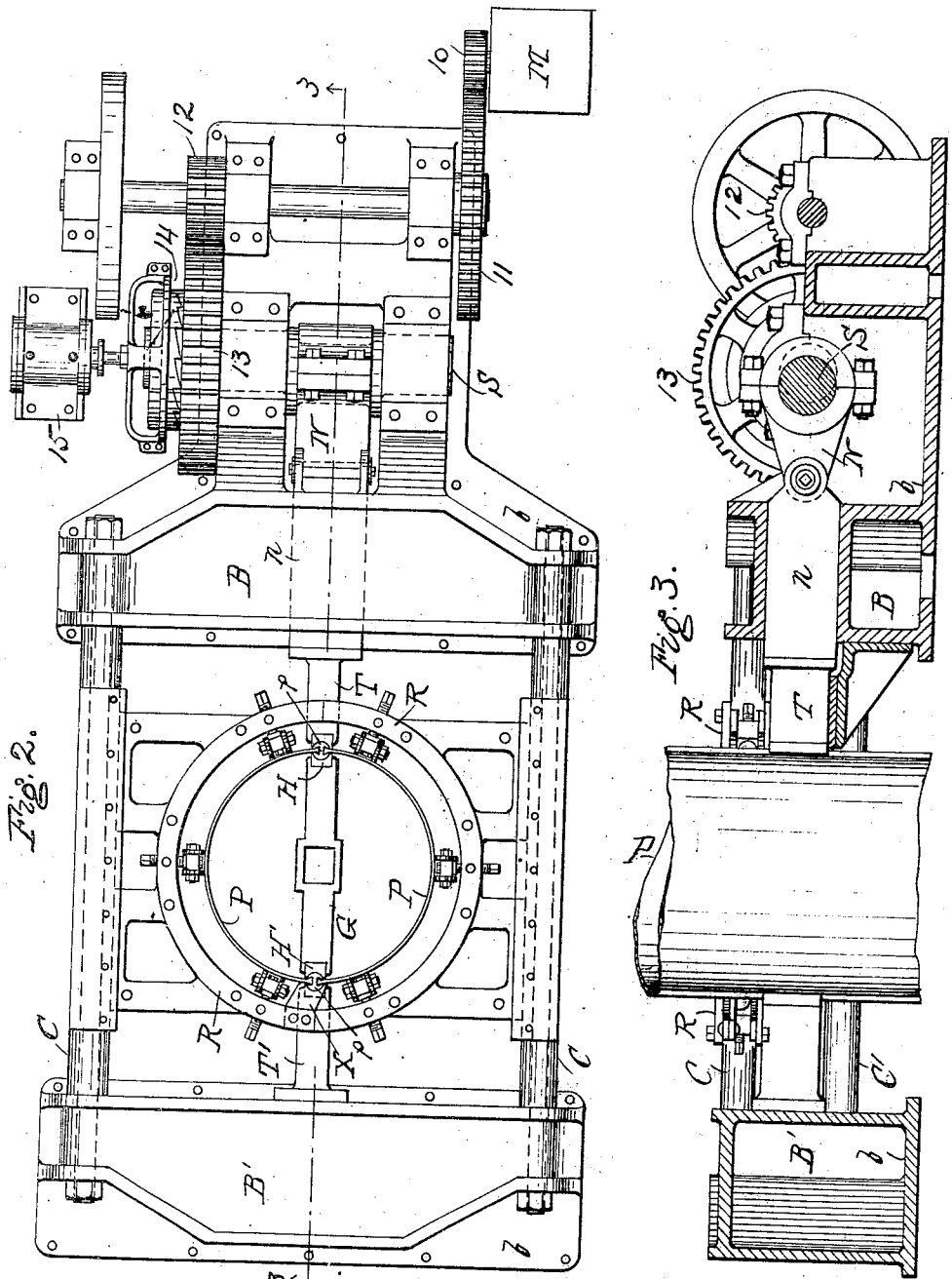

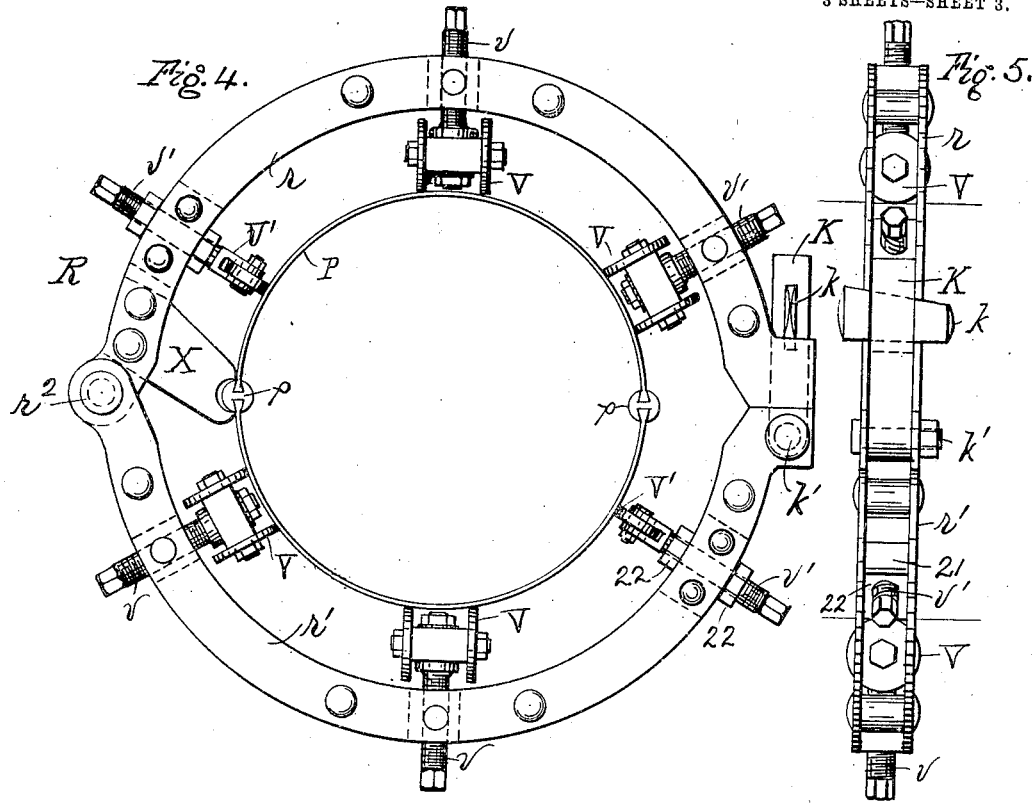

JOHN FRASER, OF HACKENSACK, AND THOMAS GRAY, OF PATERSON, NEW JERSEY.

PRESS FOR MAKING PIPES.

No. 914,369.  Specification of Letters Patent.  Patented March 2, 1909.

Application filed May 23, 1908. Serial No. 434,541.

*To all whom it may concern:*

Be it known that we, JOHN FRASER, a citizen of the United States of America, residing in Hackensack, in the county of Bergen and State of New Jersey, and THOMAS GRAY, a subject of the King of Great Britain and Ireland, residing in Paterson, in the county of Passaic and State of New Jersey, have invented a certain new and useful Improved Press for Making Pipes, of which the following is a specification.

Our invention relates to a press or apparatus for squeezing locking bars on the upset edges of metal plates, which have been previously bent to shape for making rivetless longitudinal joints in sheet metal pipes.

The main objects of our invention are to so construct the apparatus as to facilitate and to increase the speed of, the operation of forming the joints, to get a better and more even squeeze by the dies, and to make better joints, and also to diminish the wear and tear on the machinery, and to simplify the latter. These objects we attain by constructing the apparatus as hereinafter described, a characteristic feature of our apparatus being to operate on the pipe while in a vertical position instead of the horizontal position heretofore used in machines of this character.

In the accompanying drawings Figure 1 is a side elevation with the pit in section; Fig. 2 is a plan view of the machine, drawn to a larger scale; Fig. 3 is a sectional view on the line 3—3, Fig. 2; Fig. 4 is a face view drawn to larger scale, of our improved guiding clamp in place about the finished pipe; Fig. 5 is an edge view of the clamp; Fig. 6 is a view of one form of adjustable guide; Figs. 7 and 8 are detached views of one of the blocks for said guides; Figs. 9 and 10 are side and edge views respectively of a modified form of guide.

As shown in Fig. 1, a pit A is constructed as deep as the longest pipe to be made, and on the foundations, at the mouth of the pit, we mount in a horizontal position the press frame, consisting of two longitudinal cross-heads B and $B^1$ connected by horizontal bars C, $C^1$, Figs. 1, 2 and 3. The cross-heads B, $B^1$ are formed with base flanges $b$, $b$, by which they may be bolted to the foundations. In the bottom of the pit is erected a flanged foot piece F supporting the vertical tube E, which carries at its head, within the plane of the horizontal frame work B, $B^1$, and C, $C^1$, a mandrel G with the dies or tools H, $H^1$ to aid in closing the locking bars $p$ over the upset edges of the curved plates to form the tube P, Figs. 2 and 4. One of the cross-heads $B^1$ carries a stationary squeezing tool $T^1$ to act on the outside of the lock bar opposite one of the tools H, $H^1$, (in the case shown, the tool $H^1$). In the other cross-head B is guided a plunger $n$ carrying a squeezing tool T to co-operate on the outside of the pipe P with the squeezing tool H on the inside (Figs. 2 and 3).

To actuate the tool T, we have shown a crank or eccentric N on a countershaft S driven from a suitable motor M through gearing 10, 11, 12, 13, and hydraulic clutch 14, 15, Figs. 2 and 3, but we do not wish to confine ourselves to such means for the operation of the squeezing tool.

The curved steel or other metal sheets with lock bars, from which the pipe is to be formed, may be held together in suitable temporary clamps, or may be guided in a guiding clamp held in the frame as hereinafter described. The curved sheets and locking bars are swung by chains Q from an overhead crane and passed vertically over the mandrel, and the squeezing tool is actuated to close the lock bar $p$, Figs. 2 and 3, on the upset edges of the sheet. This is accomplished on the locking bars on diametrically opposite sides of the pipe at once through the interposition of the mandrel G carrying the tools H, $H^1$.

With the view of making more perfect joints and further facilitating the handling of the plates and bars, we provide a guiding clamp R for the pipe being formed, and we prefer to mount this clamp upon the frame so that the pipe may be fed through this stationary guiding clamp, as the pipe is operated on. We prefer to so construct the clamp as to permit of extra pressure being brought to bear on any diametrical part of the pipe where needed, as in the making of these pipes it is found that the plates will often lack the desired true cylindrical form at the longitudinal joints when the squeezing tools in the press squeeze up the lock bars. By our improved clamp hereinafter described, it is possible to relieve the pressure at one point of the diameter and increase it at another, so as to insure the making of perfect joints.

The clamp consists of a ring R in two parts, $r$ and $r^1$, carrying radially adjustable guides with bearing rolls to bear on the tube P in which the longitudinal joints are being formed by the squeezing of the locking bars $p$. In Figs. 4 and 5, I have shown the ring separate from the machine, and with the two parts, $r$ and $r^1$ hinged together at $r^2$, and adapted to be secured together at the diametrically opposite side by any suitable fastening means, such as a key $k$ passing through a hasp K, hinged at $k^1$ to one half of the ring, and key $k$ bearing on shoulders on the other half, Fig. 5. Or as shown in Fig. 2, the two parts may be held together by the frame of the machine, thus permitting of their being firmly held together and providing for free movement in the direction of the squeeze. In suitable carrying blocks in this ring are radially mounted the threaded stems of guides V (V¹) having bearing rollers on their inner ends. In one form of guide V, shown separately in Fig. 6, the threaded stem 17 is mounted to turn in a block 8, which has trunnions for a pair of bearing rollers 16. The form of threaded carrying block for the threaded stem of this construction of guide is shown at 23 in Figs. 7 and 8. In another form of guide V¹, shown separately in Figs. 9 and 10, the threaded stem 19 is formed at its inner end like a caster with a single roller 20. In this construction the threaded stem is not threaded into the bearing or carrying block 21, Fig. 5, but passes freely through it, and adjustment is secured by manipulating the nuts 22, Fig. 4. In Figs. 2 and 4, we have shown six of these radial roller guides, but it will be understood that the number may be varied as the diameter of the pipe or other circumstances may require, provided some of these adjustable guides are sufficiently adjacent to the longitudinal joint or joints that by adjusting such guides inwardly or outwardly at the proper points, the edges of the plates may be brought and kept circumferentially true in the grooves of the lock bars. Often on account of hard spots in a plate, causing the plate to be flat for a short distance back from the edge or edges, the upset edge of the plate is liable to touch the bottom of its groove in the lock bar on one side only, and therefore if the squeeze takes place before this is corrected, it provides an imperfect joint, liable to break the lock bar when the pipe is put under internal pressure, or at best, it leaves a leaky spot at the joint. It will be readily seen that by adjusting any one or more of the guides inwardly or outwardly, the pipe may always be kept trued up to a proper cylindrical form and the joints made perfect and tight in squeezing the locking bars $p$ over the upset edges of the curved pipe plates. At the same time the rollers will allow the pipe to be fed through the clamping ring.

We prefer to provide one of the halves of the clamping ring with a guide claw X, (Figs. 2 and 4), to engage one of the locking bars, so as to insure the placing of the roller bearings to the best advantage to act on the curved plates of the pipe.

Some of the advantages of our press over the horizontal machines heretofore used are that with the combination before described, it is very easy to manipulate the pipe, keep it parallel to the axis of the mandrel, and secure parallel squeezes on the lock bars, whereas with the horizontal mandrel machines, it is very difficult, if not impossible, to manipulate the pipe so as to cause it to rise along its entire length uniformly and simultaneously with the movement of the tools that press the lock bars, and the squeeze is liable to be not parallel with the axis of the pipe, so that a leaky joint is apt to result. To get satisfactory results in horizontal machines, mechanical complications and great care and skill are required. Furthermore, our vertical mandrel is much easier to maintain than is a horizontal one of the great length and weight required for the work. The horizontal mandrel can be kept in line only with difficulty, and constant watchfulness is necessary to prevent breaking or getting out of alinement.

We claim as our invention—

1. In an apparatus for closing longitudinal lock bar pipe joints, means for closing said joint and a guiding clamp for the pipe arranged in front of but adjacent and stationary with relation to said closing means during the making of the joint, substantially as described.

2. In an apparatus for closing longitudinal lock bar pipe joints, means for closing said joint and a guiding clamp for the pipe arranged in front of but adjacent and stationary with relation to said closing means during the making of the joint, said clamp being provided with means for pressing the edges of the plates true in the lock bar, substantially as described.

3. An apparatus for closing longitudinal lock bar pipe joints, comprising a frame, mandrel and squeezing tools with adjustable truing means through which the pipe is caused to travel, said truing means being adjacent to the squeezing tools and on both sides of the lock bar to keep the edges of the plates circumferentially true in the lock bar.

4. An apparatus for closing longitudinal lock bar pipe joints, comprising a frame, vertical mandrel and horizontal squeezing tools with means for suspending the pipe vertically and allowing it to descend through the machine, and adjustable truing means through which the pipe is allowed to travel, said truing means being adjacent to the squeezing tools and on both sides of the lock bar, to keep the edges of the plates circumferentially true in the lock bar.

5. An apparatus for closing longitudinal lock bar pipe joints, comprising a frame with vertical mandrel and horizontal squeezing tools, in combination with stationary but adjustable truing means through which the pipe is caused to travel, said truing means being adjacent to the squeezing tools and on both sides of the lock bar, to keep the edges of the plates circumferentially true in the lock bar.

6. An apparatus for closing the longitudinal lock bar pipe joints, comprising a frame, mandrel and squeezing tools, in combination with stationary but adjustable truing means, some of them adjacent to the longitudinal joint on both sides of the lock bar, as and for the purpose described.

7. An apparatus for closing longitudinal lock bar pipe joints, comprising a frame, vertical mandrel and horizontal squeezing tools, in combination with a stationary guiding clamp having a number of adjustable bearing means, some of them adjacent to the longitudinal joints and on both sides of the lock bar, as and for the purpose described.

In testimony whereof we have signed our names to this specification, in the presence of two subscribing witnesses.

JOHN FRASER.
THOMAS GRAY.

Witnesses:
WALTER ABBE,
M. G. KEIR.